May 27, 1958 S. STERNBERG ET AL 2,836,720

BALANCING CIRCUIT

Filed Sept. 6, 1955 2 Sheets-Sheet 1

INVENTORS
Sidney Sternberg
& Arthur W. Vance
BY
Morris L. Rabkin
ATTORNEY

May 27, 1958 S. STERNBERG ET AL 2,836,720

BALANCING CIRCUIT

Filed Sept. 6, 1955 2 Sheets-Sheet 2

INVENTORS.

Sidney Sternberg & Arthur W. Vance

BY Morris L. Rabkin

ATTORNEY

United States Patent Office 2,836,720

Patented May 27, 1958

2,836,720

BALANCING CIRCUIT

Sidney Sternberg, Princeton, and Arthur W. Vance, Cranbury, N. J., assignors to Radio Corporation of America, a corporation of Delaware Application September 6, 1955, Serial No. 532,542

6 Claims. (Cl. 250—27)

This invention relates to electronic balancing circuits, and particularly to electronic circuits that may be used to compensate for different dynamic characteristics of control devices in electronic switching circuits.

This invention may be used with electronic switching circuits such as are described in the publication "A High-Accuracy Time-Division Multiplier," by E. A. Goldberg, in RCA Review, September 1952, at page 265, and in U. S. Patent No. 2,619,594. In an electronic switch of this type, two or more electron tubes have their cathodes connected together and to a high impedance current source. The tubes are alternately driven conductive and non-conductive, only one tube being conductive at any time. The current from the source is switched to the path provided by the conductive tube. For accurate operation, the current switched through the switch tubes should be independent of the tube characteristics. In general, the impedance of the current source may be made sufficiently high compared to the plate resistances of the switch tubes so that these plate resistances do not affect materially the magnitude of the current from the source.

However, where switching is performed at high speeds, and where accuracy requirements are also high, the effects of different tube characteristics may be material. In the aforementioned switching circuit, parasitic capacitances, such as tube and wiring capacitances, generally exist between the cathodes of the switch tubes and a common circuit connection such as ground. Different plate resistances of the switch tubes result in different cathode voltages for any particular current magnitude. This cathode voltage swing tends to charge and discharge the parasitic capacitance. This charging and discharging results in current being subtracted from one switch tube and added to the other, instead of both tubes passing the same current. A high switching frequency and a large time constant for the parasitic capacitance circuit produce a difference in the currents switched by the tubes and a difference in total charge during one switching period beyond that which can be tolerated by certain high accuracy requirements.

Accordingly, it is among the objects of this invention to provide:

A new and improved electronic compensating circuit for an electron control device;

A new and improved balancing circuit for an electronic switching circuit;

A new and improved switching circuit that can operate accurately at high frequencies.

In accordance with this invention, a compensating circuit for an electron control device includes an amplifier connected between the cathode electrode and the control electrode of the device. By means of this amplifier a feedback loop is provided for transferring a voltage swing at the cathode electrode to the control electrode. In a switching circuit, in accordance with this invention, a plurality of electron control devices are provided, and a balancing amplifier is coupled between a common cathode terminal and the control electrodes of these devices for transferring a cathode voltage swing to the control electrodes.

The foregoing and other objects and advantages, as well as the invention itself, both as to its organization and mode of operation, may be best understood from the following description when read in connection with the accompanying drawing, in which like reference numerals refer to like parts, and in which.

Figure 1:
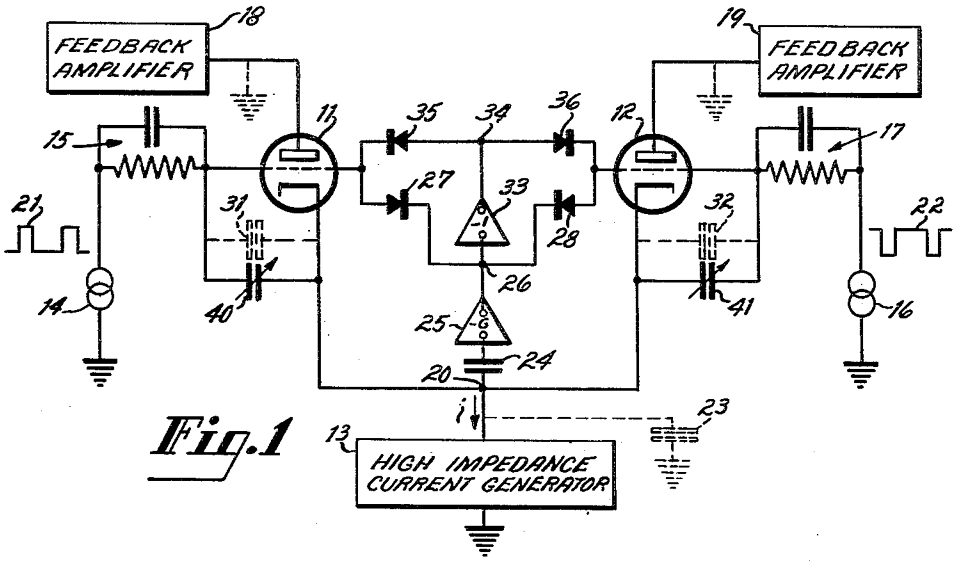
Figure 1 is a schematic circuit and block diagram of an embodiment of this invention.

In the circuit of Figure 1, two switching tubes 11 and 12 have their cathodes connected together and to one terminal of a high-impedance current generator 13. The other terminal of the current generator 13 is connected to a common circuit connection shown as the conventional ground symbol. A first source 14 of alternating rectangular pulses 21 is connected to the grid of the first tube 11 through a parallel resistor-capacitor combination 15. A second source 16 of rectangular pulses 22 is similarly connected to the grid of the second tube 12 through a resistor-capacitor combination 17. The pulses from the sources 14 and 16 are 180° out of phase. These sources 14 and 16 may be, for example, the two low-impedance outputs of a multivibrator 54 (shown in Figure 4).

In the use of the switching circuit of Figure 1 in a multiplier system such as that described in the article cited above, the anodes of the switch tubes 11 and 12 are connected to the inputs of direct current (D. C.) feedback amplifiers 18 and 19, respectively. The tubes 11 and 12 operate to feed the current from the source 13 to the amplifiers 18 and 19. These amplifier inputs (current summing points) are substantially held at ground potential by the dynamic operation of the amplifiers 18 and 19. This ground potential level of the inputs of the amplifiers 18 and 19 is shown in broken lines in Figure 1.

The common cathode terminal 20 of the switch tubes 11 and 12 is coupled to ground by a parasitic capacitance 23 shown in broken lines in Figure 1. This parasitic capacitance 23 includes, for example, the wiring capacitances in the circuit. The cathode terminal 20 is coupled through a capacitor 24 to the input of an A.-C. balancing amplifier 25. The output of the balancing amplifier 25 is connected to a terminal 26 between the cathodes of two diodes 27 and 28. The anodes of these diodes 27 and 28 are connected to the grids of the switch tubes 11 and 12.

Figure 2:
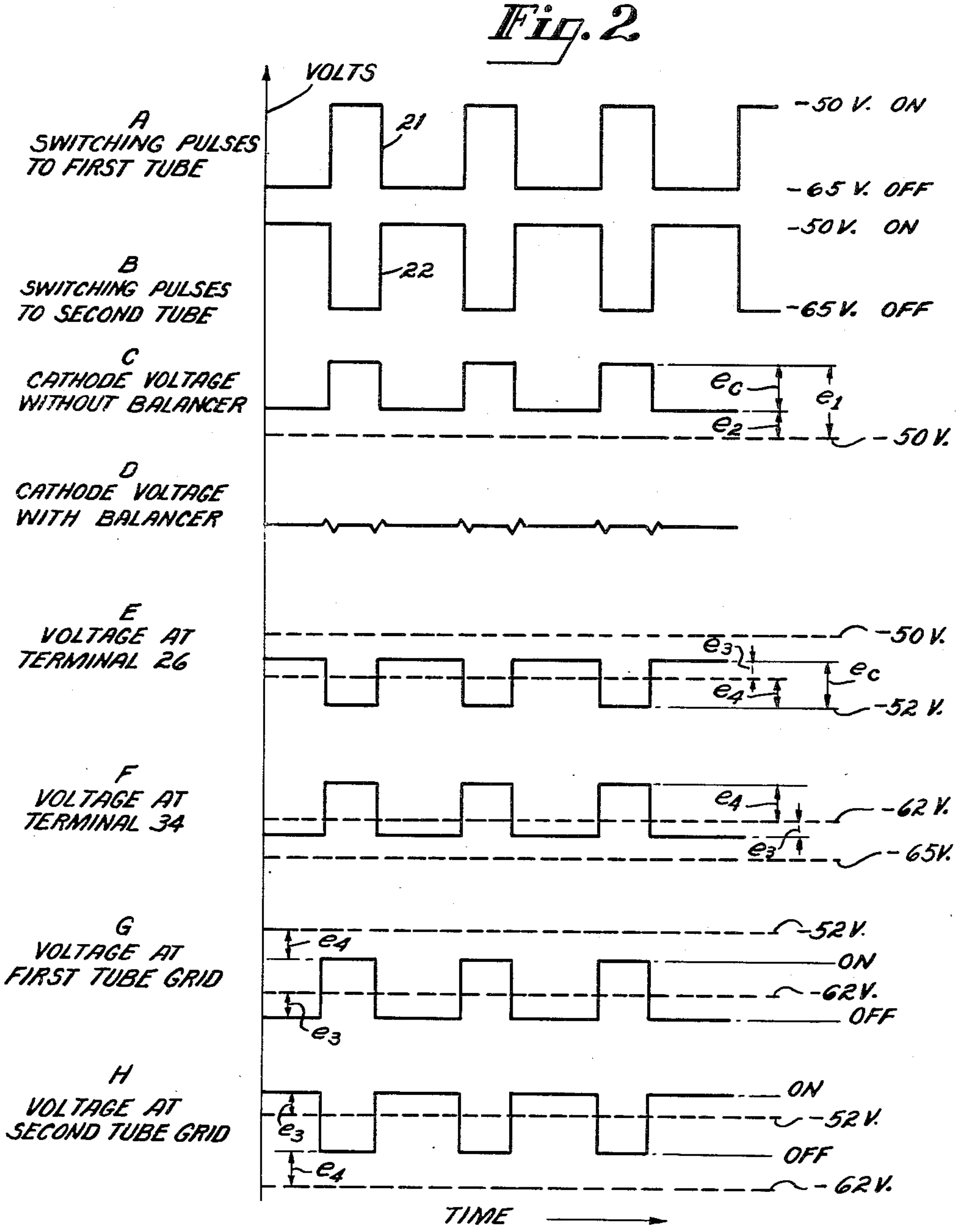
Figure 2 is an idealized graph of waveforms used to explain the circuit of Figure 1.

The operation of the circuit of Figure 1 without the balancing amplifier 25 connected in the circuit is discussed first in order that the function of that amplifier 25 may be fully understood. Line A of Figure 2 shows the pulses applied to the grid of tube 11 from the source 14, and line B shows the corresponding pulses from the source 16. (The illustrative voltage amplitudes shown in Figure 2 are appropriate for the specific circuit parameters of Figure 4, discussed below.) The pulses 21 and 22 from the sources 14 and 16, respectively, that are applied to the grids of the switch tubes 11 and 12 are 180° out of phase. A positive-going pulse 21 renders the first tube 11 conductive at the same time that a negative-going pulse 22 renders the second tube 12 cut off. In this way, only one of the tubes 11 and 12 conducts at any time to feed the current from the source 13 to the associated amplifiers 18 and 19.

The tube that conducts acts as a cathode follower, with the high impedance of the current source 13 being the cathode impedance. Without the balancing amplifier 25, the common cathode terminal 20 assumes a voltage level which is the voltage on the grid of the conducting tube plus the grid bias voltage that is required for the conducting tube to pass the current that is supplied from the high-impedance source 13. Generally speaking, the two tubes 11 and 12 will not have dynamic plate resistances or plate-current versus grid-bias characteristics that are or remain the same. As a result, the grid-cathode voltage during conduction of the first tube 11 is different from the corresponding grid-cathode voltage during conduction in the second tube 12. This difference in grid-cathode voltage does not affect the grid voltages of the tubes 11 and 12, because these grid voltages are controlled by the voltages of the sources 14 and 16. Therefore, the different grid-cathode voltages result in different cathode voltages, the latter being shown graphically in Figure 2 on line C.

The waveforms of line C are explained by assuming, for example, that the first tube 11 has a relatively low plate resistance and the second tube 12 has a relatively high plate resistance. The resulting grid-cathode voltage $e_1$ (see Fig. 2C) during conduction in the first tube 11 is smaller than that, $e_2$, during conduction in the second tube 12. Therefore, the voltage at the cathode terminal 20 during conduction in the first tube 11 is less negative than that during conduction in the second tube 12, as shown in Figure 2C. Thus, the voltage swing at the terminal 20 without the balancing amplifier 25 is $e_1-e_2$, which voltage swing is the change in voltage $e_c$ across the capacitance 23. The voltage (ordinate) scale factor is not the same for all the waveforms in Figure 2; for example, the cathode voltage amplitudes shown in line C, which are actually only a few tenths a volt, are distorted relative to those of lines A and B to simplify the illustration.

Figure 3:
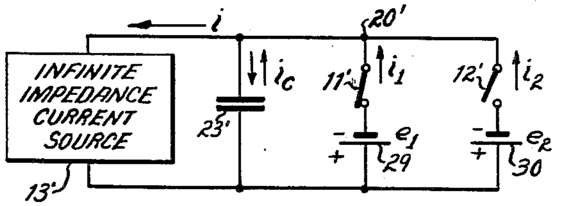
Figure 3 is a schematic circuit diagram used to explain the circuit of Figure 1.

In Figure 3, an equivalent circuit is shown for the switch circuit of Figure 1 without the balancing amplifier 25 connected in circuit. Parts corresponding to those shown in Figure 1 are referenced by the same numerals with the addition of a prime (′). Corresponding to the switch tubes 11 and 12 are the switches 11′ and 12′. The batteries 29 and 30 correspond to the different voltages $e_1$ and $e_2$ appearing at the cathode terminal 20. If the voltage from battery 29 is less negative than that from battery 30, part of the current $i_1$ (considered in the conventional current sense) through the first switch 11′ is a current $i_c$ that changes the charge on the capacitance 23′ in a positive direction. Thus, the current $i_1$ through the first switch 11′ is greater than the source current $i$ by this charging current $i_c$. The current $i_2$ through the second switch 12′ is less than the source current $i$ by the current $i_c$ from the capacitance 23′ which changes the charge in a negative direction. Thus, the currents $i_1$ and $i_2$ through the switch tubes 11 and 12 differ by twice the charging current $i_c$ during the time periods of charging and discharging the capacitance 23. This difference in currents fed to the amplifiers 18 and 19 for any particular current supplied by the source 13 may result in substantially inaccuracies in the system that includes these amplifiers 18, 19. The current supplied by the source 13 may vary during the operation of the system. Therefore, there are corresponding variations in the voltage swing at the cathode terminal 20. These dynamic variations cannot be properly compensated by an adjustment of static circuit parameters.

The operation of the circuit of Figure 1 with the balancing amplifier 25 connected in the circuit may be described as follows: When the first switch tube 11 starts to conduct, the voltage at the cathode terminal 20 starts to rise as described above. The amplifier 25 amplifies and inverts this voltage change at the terminal 20 and feeds a voltage level to the terminal 26. This voltage level is below the voltage of the pulse 21 supplied by the source 14. Therefore, the diode 27 conducts and limits the positive-going grid voltage swing of the first tube 11 to the lower voltage level of the terminal 26. This decrease in grid voltage is in the direction to increase the plate resistance of the first tube 11 and to prevent a substantial rise in voltage at the cathode terminal 20. The amplifier 25 provides a negative feedback loop, which loop is completed through the switch tube 11. The amplifier 25 tends to reduce the voltage change at its input, the terminal 20, towards zero; actually, a reduction by a factor of the amplifier gain, G. In practice, the amplifier gain G may be 100 or more so that cathode voltage swing is reduced to a negligible value. During conduction in the first tube 11, the grid voltage of the second tube 12 is negative with respect to the voltage at the terminal 26, and the diode 28 is cutoff.

When the second tube 12 conducts, the voltage at the cathode terminal 20 tends to go negative with respect to that during conduction in the first tube 11. The voltage level at the amplifier output 26 during second tube conduction is positive with respect to that during conduction in the first tube 11. However, this voltage level during second tube conduction is arranged to be somewhat more negative than the turn-on voltage of the pulse 22 on the second tube grid. Therefore, the diode 28 conducts and clamps the grid of the second tube 12 to the voltage of the terminal 26. The voltage waveform at the terminal 26 is shown in line E of Figure 2. The feedback amplifier 25 operates to reduce to substantially zero the negative-going voltage swing at the cathode terminal, operating in a manner similar to that during first tube conduction, as described above.

The effect of this balancing amplifier 25 is to transfer the voltage swing from the cathode terminal 26 to the amplifier output 26. A direct voltage level (shown as −52 volts in Figure 2) is provided at the amplifier output 26 which is more negative than the turn-on voltage (−50 volts) of the switching pulses 21 and 22. The voltage swing transferred to the amplifier output 26 is positive-and-negative-going with respect to the D.-C. level of −52 volts. This D.-C. level is so chosen that the voltage at the terminal 26 is always less than the turn-on voltage of the switching pulses 21 and 22 over the expected range of operation.

As shown in line E of Figure 2 the negative-going portion $e_4$ of the voltage swing from the D.-C. level of −52 volts is the amount that the compensated turn-on grid voltage of the first tube 11 is less than −52 volts (line G). The positive-going portion $e_3$ from −52 volts is the amount that the compensated turn-on grid voltage of the second tube 12 is greater than −52 volts (line H). This unbalance of the grid voltages is such as to increase the plate resistances of the tubes 11 and 12 by different amounts, the first tube 11 by a greater amount than the second tube 12, making these plate resistances substantially equal.

The cathode voltage swing is reduced by the gain factor G to substantially zero. The voltage swing at the cathode terminal 20 with the balancer 25 connected in the circuit is shown in line D of Figure 2. Small voltage ripples that remain at the cathode terminal 20 are due to the frequency response of the balancing amplifier 25. The bandwidth of the balancing amplifier 25 should be broad enough to accommodate changes in unbalance of the two sections of the switch due to changes in current from the source 13. In practice, an amplifier bandwidth greater than the switching frequency has been found to be satisfactory.

In the discussion so far, the cathode-to-grid capacitance 23 has been considered. In addition, there is a grid-to-cathode capacitance in each of the switch tubes 11 and 12. These capacitances 31 and 32 are shown in broken lines in Figure 1. As described above, the effect of the balancing amplifier 25 is to transfer the voltage swing at the cathode terminal 20 to a difference in turn-on grid voltages for the switch tubes 11 and 12. The clamping diodes 27 and 28 prevent the voltage changes at the terminal 26 from affecting the turn-off grid voltages of the switch tubes 11 and 12. In the arrangements described thus far, it has been assumed that the turn-off grid voltages of the tubes 11 and 12 remain at −65 volts, as shown in lines A and B of Figure 2. Under such assumed circumstances, there would be different grid voltage swings for the switch tubes 11 and 12, which voltage swings would result in differences in the charging of the capacitances 31 and 32. Therefore, for reasons similar to those discussed above, there would be an unbalance in the currents and total charge transferred through the switch tubes 11 and 12. The error contribution of the grid-to-cathode capacitance has been found not to be as serious as that due to the cathode-to-ground capacitance 23. Nevertheless, this grid-to-cathode capacitance 31 and 32 may lead to undesirable errors.

Compensation for the grid-to-cathode capacitances 31 and 32 is achieved by a phase-reversing amplifier 33 of unity gain connected between the terminal 26 and a terminal 34. The terminal 34 is connected to the anodes of two diodes 35 and 36. The cathodes of these diodes 35 and 36 are connected to the grids of the switch tubes 11 and 12.

The voltage waveform appearing at the terminal 34 is the same as that at the terminal 26, except that it is inverted, and the D.-C. voltage level is at −62 volts, as shown in line F of Figure 2. During conduction in the first tube 11, the diode 35 is cut off and does not affect the grid voltage of the first tube 11. However, the voltage at the terminal 34 is relatively positive with respect to the turn-off voltage of the switching pulse 22. Therefore, the diode 36 conducts to clamp the grid voltage of the second tube 12 at the voltage of the terminal 34. Similarly, when the first tube 11 is cut off the diode 35 conducts to clamp the grid voltage of the first tube 11 at the voltage of the terminal 34. In this way, the voltage differential in the turn-on voltage levels of the switch tubes 11 and 12 is supplied as a differential in the turn-off voltage levels of these tubes, but in the reverse direction. That is, the final grid voltage swings are such that the turn-on voltage level of the first tube 11 is $e_3+e_4=e_c$ volts more negative than that of the second tube 12; and the turn-off voltage level of the first tube 11 is also more negative than that of the second tube 12 by the same amount. Thus, the voltage swings at the grids of the first and second tubes 11 and 12 are made equal. As a result, the charging of the grid-to-cathode capacitances 31 and 32 is the same, and the current transferred through the switch tubes 11 and 12 is also the same.

An additional effect tending to unbalance the switch is that the grid-to-cathode capacitance 31 of the first tube 11 is not the same as the grid-to-cathode capacitance 32 of the second tube 12. This difference in capacitance tends to produce an unbalance in the switch action at the cathode terminal 20, in a manner similar to that described above, because there would be an unbalance in charging of these different capacitances 31 and 32 notwithstanding the same grid voltage swing. However, it has been found that this capacitance differential tends to be a static one and does not vary appreciably with signal level and time. Correction of this difference in grid-to-cathode capacitances is made by a small differential capacitance, which is shown in Figure 1 as separate grid-to-cathode capacitances 40 and 41 connected between the grids and cathodes of the first and second tubes 11 and 12, respectively.

Figure 4:
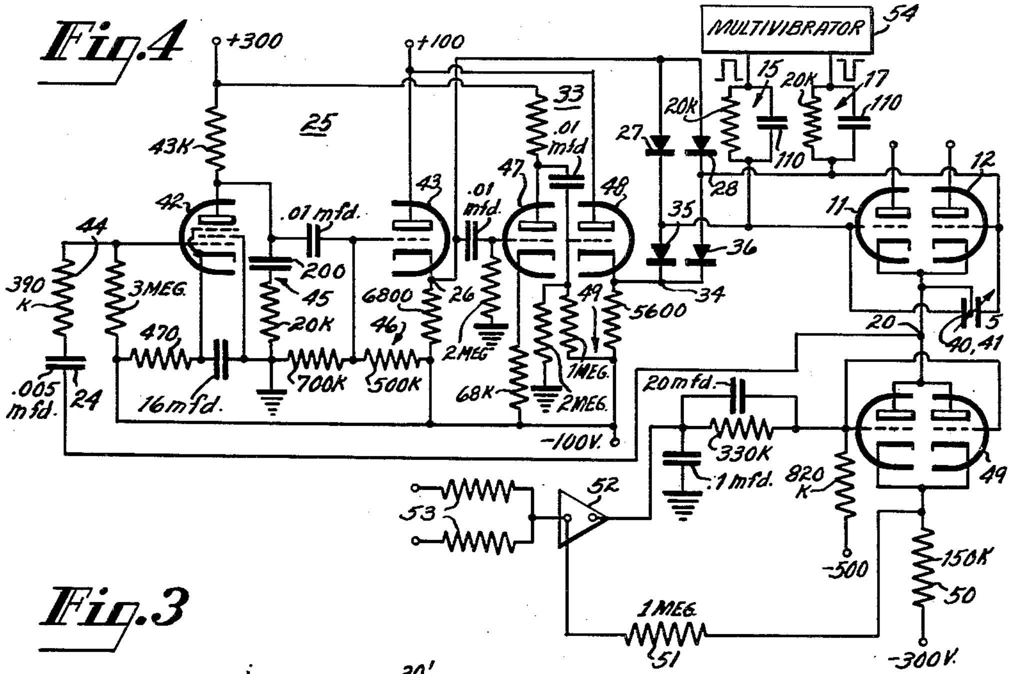
Figure 4 is a schematic circuit diagram of an electronic switch embodying this invention.

Shown in Figure 4 is a schematic circuit diagram of an electrical switch incorporating the balancing amplifier 25 and phase reversing amplifier 33 described above. Parts corresponding to those previously described are referenced by the same numerals. The stabilizing amplifier 25 includes a single pentode amplifier stage 42 and a cathode follower output stage 43. The input resistor 44 forms an R–C combination with the grid-to-cathode capacitance of the pentode 42 that ensures proper high frequency response. The series R–C combination 45 between the anode of the pentode 42 and ground is a stabilizing network. The resistance divider 46 sets the grid bias of the cathode follower 43 and, thereby, the desired D.-C. voltage level at the terminal 26. The phase-reversing amplifier 33 includes a triode inverter stage 47, capacitor-coupled to the amplifier output 26, and a cathode follower output 48 similar to the cathode follower 43.

The current source includes a twin-triode envelope 49 as the current regulator tube. The substantially constant voltage at the terminal 20 permits the use of a triode current source instead of a pentode. The cathode circuit of the triode includes the resistor 50 and the feedback resistor 51 to the input of a high gain D.-C. feedback summing amplifier 52. The output of the amplifier 52 is connected through an R–C combination to the grids of the tubes 49. The input signals are applied through summing resistors 53 to the input of the amplifier 52. The feedback circuit through the amplifier 52 ensures that the current through the regulator tube 49 is maintained proportional to the sum of the input signals. The operation of this current source is described in greater detail in the aforementioned patent.

The specific circuit parameters set forth in Figure 7 are for the purpose of illustrating an appropriate embodiment. Tube type 6U8 was used for tubes 42 and 43, type 12AT7 for tubes 47 and 48, 6CG7 for tubes 11, 12, and 49, and 1N54 for the diodes. Capacitances are in micromicrofarad units except where micro-farads are indicated.

By means of this invention, a new and improved balancing circuit is provided to compensate for variations in dynamic tube characteristics. An electronic switch incorporating such a balancing circuit can be operated accurately at high frequencies and over long periods of time.

What is claimed is:

1. A switching circuit comprising a plurality of electron control devices having anode, cathode, and control electrodes, means for applying switching voltages to said control electrodes to render said devices alternately conductive, an impedance connected in common to said cathode electrodes, and amplifier means connected between said cathode electrodes and said control electrodes for reducing the voltages at said control electrodes in accordance with increasing and decreasing variations in voltage at said cathode electrodes.

2. A switching circuit comprising a plurality of electron control devices having anode, cathode, and control electrodes, means for applying switching signals to said control electrodes to render said devices alternately conductive, a variable current generator connected to said cathode electrodes for receiving input signals and for varying the value of current in the conductive one of said devices in accordance therewith, and amplifier means connected between said cathode and control electrodes for varying the voltages at said control electrodes in response to variations in voltage at said cathode electrodes.

3. A switching circuit comprising a plurality of electron control devices having anode, cathode, and control electrodes; means for applying switching voltages to said control electrodes to render said devices alternately conductive; a variable current generator connected to said cathode electrodes for receiving input signals and for varying the value of current in the conductive one of said devices in accordance therewith; and means for reducing voltage swings at said cathode electrodes due to differences in the characteristics of said devices, said last-mentioned means including a high-gain amplifier connected to receive voltage changes at said cathode electrodes, and means connecting the output of said amplifier to said control electrodes to limit the device-conductive switching voltages applied to said control electrodes in accordance with said voltage changes.

4. A switching circuit comprising a plurality of grid-controlled electron tubes; means for applying switching voltages to the grids of said tubes to render alternately one of said tubes conductive and another non-conductive; a variable current generator connected to the cathodes of said tubes for controlling the current passed by the conductive one of said tubes; and means for reducing voltage swings at said cathodes due to differences in the characteristics of said tubes, said last-mentioned means including a high-gain amplifier coupled at its input to said cathodes to receive voltage changes thereat and for producing at its output voltages varying in accordance with said voltage changes, and diode means coupled between said amplifier output and said grids for limiting the tube-conductive grid voltages to said amplifier output voltages.

5. An electronic circuit comprising a plurality of electron control devices having anode, cathode, and control electrodes, means for applying control voltages to said control electrodes, a large common impedance means connected to said cathode electrodes in series with the anode-cathode current paths of said devices, high-gain feedback amplifier means connected between said cathode electrodes and said control electrodes for varying the control voltages at said control electrodes in response to variations in voltage at said cathode electrodes, and separate diode means connected between said amplifier means and said control electrodes for producing variations in the control voltages in only one direction.

6. A switching circuit comprising a plurality of electron control devices each having a plurality of electrodes; means for applying switching signals to control ones of said electrodes to render said devices alternately conductive between first and second ones of said electrodes of the respective devices; separate means coupled to said first electrodes of the respective devices for receiving the current through the associated devices; common means coupled to said second electrodes for receiving input signals and for varying the amplitude of current through the conductive one of said devices in accordance with said input signals; and means for reducing signal changes at said second electrodes due to differences in the characteristics of said devices, said last-mentioned means including amplifier means connected between the output of said amplifier means and said control electrodes to limit the amplitude of said switching signals in accordance with said second electrode signal changes.

References Cited in the file of this patent

UNITED STATES PATENTS

| | | |
|---|---|---|
| 2,619,594 | Goldberg | Nov. 25, 1952 |
| 2,647,214 | Penney et al. | July 28, 1953 |
| 2,714,137 | Dzwons | July 26, 1955 |